A. T. MAENCHE.
FASTENING DEVICE.
APPLICATION FILED JULY 13, 1908.
921,134.
Patented May 11, 1909.
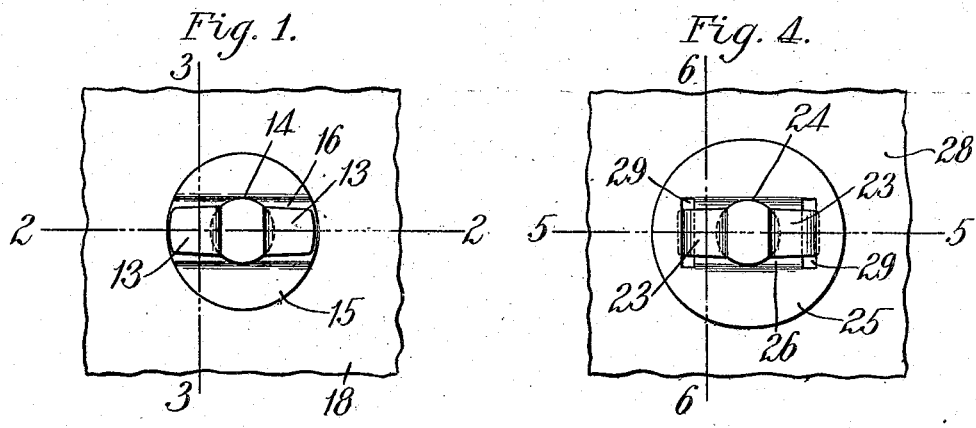
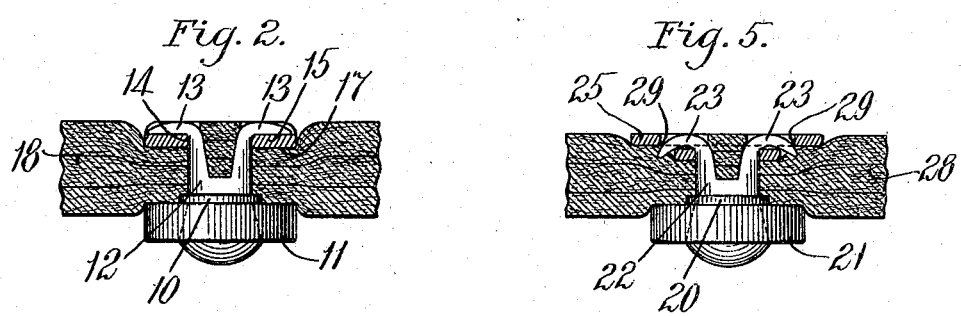
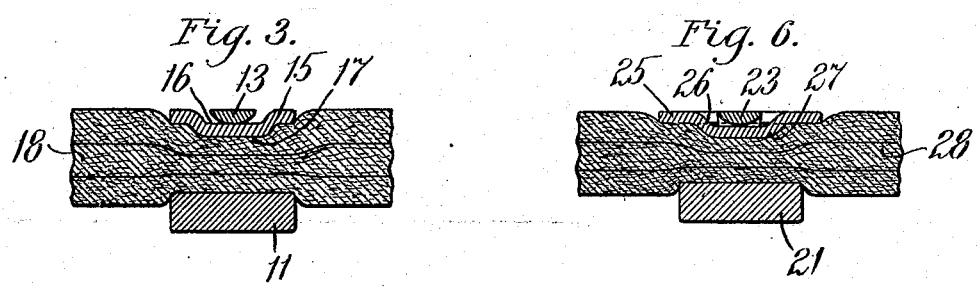
Witnesses.
Franklin E. Low.
William A. Glass.
Inventor:
Albert T. Maenche,
by his attorney, Charles S. Gooding.

UNITED STATES PATENT OFFICE.

ALBERT T. MAENCHE, OF WALTHAM, MASSACHUSETTS, ASSIGNOR TO JUDSON L. THOMSON M'F'G COMPANY, A CORPORATION OF MAINE.

FASTENING DEVICE.

No. 921,134.      Specification of Letters Patent.      Patented May 11, 1909.

Application filed July 13, 1908. Serial No. 443,269.

*To all whom it may concern:*

Be it known that I, ALBERT T. MAENCHE, a citizen of the United States, residing at Waltham, in the county of Middlesex and State of Massachusetts, have invented new and useful Improvements in Fastening Devices, of which the following is a specification.

This invention relates to an improved fastening device comprising a bifurcated rivet and a washer, bur or the like fast thereto.

The device of my invention while it may be employed for a variety of purposes for which rivets are used is particularly adapted for use in pneumatic tire shoes or covers and when used in this connection the rivet head which is located on the outside of the shoe acts to prevent slipping or skidding and in addition receives the greater part of the wear. Heretofore bifurcated rivets without washers have been used for this purpose, but the movements of the rivets in the leather in which they were secured caused the prongs to cut or wear away the leather allowing the rivet to drop out. Such rivets when used with ordinary flat washers would be unsuitable for the reason that the portions of the prongs which project from the face of the washer would injure the tire by their constant rubbing action thereagainst.

The object of my invention is to overcome the aforementioned objections to the use of bifurcated rivets and in the attainment of this object I have provided in combination with a bifurcated rivet a washer or the like provided with a hole through which the shank of said rivet extends and having a depression adapted to receive the prongs when the same are clenched so as to present a substantially flush surface which will not injure the tire.

Another feature of my invention resides in the provision of two holes in the washer into which the ends of the prongs extend when fully clenched, thereby not only causing the device to present a substantially flush surface, but the prongs when located in said holes cannot become straightened out and disconnected from the washer.

Still another feature of my invention resides in forming the aforesaid depressions by bending the washer, thus forming also corresponding projections on the opposite side, which projections act to prevent the washer and rivet from rotating and these projections being rounded cannot cut the leather in which they are embedded.

Referring to the drawing: Figure 1 is a plan of a fastening device embodying my invention. Fig. 2 is a sectional elevation taken on line 2—2 of Fig. 1. Fig. 3 is a sectional elevation taken on line 3—3 of Fig. 1 looking toward the left. Fig. 4 is a plan of a modified form of fastening device embodying my invention. Fig. 5 is a sectional elevation taken on line 5—5 of Fig. 4. Fig. 6 is a sectional elevation taken on line 6—6 of Fig. 4, looking toward the left.

Like numerals refer to like parts throughout the several views of the drawing.

In the drawing, referring now to Figs. 1 to 3, inclusive, 10 is a bifurcated rivet having a head 11 which may be of any suitable character for the particular purpose for which the rivet is to be used, said rivet having a shank 12 provided with two prongs 13, 13 which extend through a hole 14 provided in a washer, bur or the like 15, said washer being provided with a depression 16 adapted to receive said prongs, said depression being preferably formed by bending or stamping said washer, thereby forming a projection 17 on the inner side corresponding to the depression 16 on the outer side. Thus it will be seen that the washer and prongs present on the one side a substantially flush surface, while the projection 17 is embedded in one of the thicknesses of leather 18 which may constitute a part of the shoe of a tire.

It will be understood that if the diameter of the hole 14 is equal to or greater than the width of the depression 16 that said depression will constitute in effect two separate depressions located upon opposite sides of said hole and the projection 17 will constitute in effect two projections on opposite sides of said hole, whereas, if said hole should be smaller in diameter than the width of said depression there would, of course, be a single depression.

It will be noted that the projection 17 is rounded, therefore, should there be any tendency for the rivet and washer to rotate in the leather the projection will prevent such rotation and the rounded corners of said projection will prevent cutting of the leather in which said projection is embedded.

Referring now to Figs. 4 to 6, inclusive, wherein a modified form of fastening device constructed in accordance with my invention is illustrated, 20 is a rivet provided with a head 21 which may be of any suitable character, said rivet having a shank 22 provided with two prongs 23 which extend through a hole 24 formed in a washer, bur or the like 25, said washer being provided with a depression 26 in which said prongs are located. The washer 25 is preferably formed by bending or stamping the same in forming the depression 26 so that there is also formed upon the inner face of said washer a projection 27 which, as shown, is embedded in one of the thicknesses of leather 28 through which the rivet extends. It will be understood that in this instance as in the form shown in Figs. 1 to 3, inclusive, if the hole 24 be of greater diameter than the width of the depression 26 that said depression will constitute in effect two depressions located on opposite sides of said hole and likewise, the projection 27 will constitute two projections located on opposite sides of said hole. In this form of my invention, the washer 25 is provided with two holes 29, 29 leading from the depression 26, the ends of the prongs 23 extending into and through said holes, thus positively locking the washer to the rivet and preventing said prongs from straightening out and becoming detached from said washer. It will also be observed that that portion of the washer 25 which surrounds the depression 26 and the holes 29 and 24 is substantially flat so that that face of the device presents a substantially smooth flat surface. Fastening devices constructed in accordance with my invention are particularly useful in leather shoes for pneumatic tires for the reason that the device cannot cut or wear away the leather and pull out of the same and also for the reason that the face which is in contact with the rubber portion of the tire structure cannot cut or wear the same away.

Having thus described my invention, what I claim and desire by Letters Patent to secure is:

1. In combination, a bifurcated rivet having prongs, and a washer or the like provided with a hole through which said rivet extends and having a depressed portion in which said prongs are located, said washer being provided also with two holes into which the ends of said prongs extend.

2. In combination, a bifurcated rivet having prongs, and a washer or the like provided with a hole through which said rivet extends and having a depressed portion in which said prongs are located, said washer being provided with two holes leading from said depressed portion, the ends of said prongs extending into said holes.

In testimony whereof I have hereunto set my hand in presence of two subscribing witnesses.

ALBERT T. MAENCHE.

Witnesses:
  CHAS. L. MUNGER,
  JNO. A. CARLSON.